(12) United States Patent
Krum

(10) Patent No.: US 6,618,820 B1
(45) Date of Patent: *Sep. 9, 2003

(54) METHOD FOR CONFIGURING AN APPLICATION SERVER SYSTEM

(75) Inventor: Brent Krum, Redmond, WA (US)

(73) Assignee: ImageX.com, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,838

(22) Filed: Jan. 10, 2000

Related U.S. Application Data

(63) Continuation of application No. 60/131,716, filed on Apr. 30, 1999.

(51) Int. Cl.⁷ ............................................... G06F 11/00
(52) U.S. Cl. ......................................... 714/13; 709/101
(58) Field of Search ............................... 714/11, 12, 13; 712/31; 709/101; 707/202

(56) References Cited

U.S. PATENT DOCUMENTS

| | | |
|---|---|---|
| 4,145,739 A | 3/1979 | Dunning et al. |
| 4,389,706 A | 6/1983 | Gomola et al. |
| 4,495,573 A | 1/1985 | Ballegeer et al. |
| 4,577,272 A | 3/1986 | Ballew et al. |
| 4,811,216 A | 3/1989 | Bishop et al. |
| 4,817,091 A * | 3/1989 | Katzman et al. ............... 714/8 |
| 4,852,001 A | 7/1989 | Tsushima et al. |
| 5,031,089 A | 7/1991 | Liu et al. |
| 5,093,794 A | 3/1992 | Howie et al. |
| 5,337,258 A | 8/1994 | Dennis |
| 5,361,362 A | 11/1994 | Benkeser et al. |
| 5,392,430 A | 2/1995 | Chen et al. |
| 5,596,751 A | 1/1997 | Glas et al. |
| 5,630,133 A | 5/1997 | Hotea et al. |
| 5,634,120 A | 5/1997 | Nagasuka et al. |
| 5,687,372 A | 11/1997 | Hotea et al. |
| 5,778,224 A * | 7/1998 | Tobe et al. ................. 709/100 |
| 5,797,000 A | 8/1998 | Bhattacharya et al. |

(List continued on next page.)

FOREIGN PATENT DOCUMENTS

| | | |
|---|---|---|
| GB | 2 274 345 | 7/1994 |

OTHER PUBLICATIONS

IBM Technical Disclosure Bulletin, "Distributed Parallel Build System for Hierarchically Organized Large Scale Software Systems", Jun. 1996, vol. 39, iss. No. 6, pp. 63–68.*
U.S. patent application Ser. No. 09/480,318, Krum, filed Jan. 10, 2000.
U.S. patent application Ser. No. 09/480,319, Krum, filed Jan. 10, 2000.
U.S. patent application Ser. No. 09/480,324, Krum, filed Jan. 10, 2000.
U.S. patent application Ser. No. 09/480,328, Krum, filed Jan. 10, 2000.
U.S. patent application Ser. No. 09/480,815, Krum, filed Jan. 10, 2000.

(List continued on next page.)

*Primary Examiner*—Scott Baderman
(74) *Attorney, Agent, or Firm*—Perkins Coie LLP

(57) ABSTRACT

A method for processing requests to service computational tasks. An application server system receives requests to run various jobs. A job indicates that a certain application program is to be executed with a certain set of input. The application server system includes a master computer and multiple slave computers. The master computer receives requests to run jobs, selects a slave computer to run each job, and then assigns each job to slave computer selected for that job. The master computer of the application server system receives the requests from client computers that may be connected to the application server system via the Internet. A client-side component of the application server system may execute on the client computers to assist users in submitting their requests.

28 Claims, 16 Drawing Sheets

U.S. PATENT DOCUMENTS

| | | | |
|---|---|---|---|
| 5,826,078 A | 10/1998 | Funaki | |
| 5,881,283 A | 3/1999 | Hondou et al. | |
| 5,897,260 A | 4/1999 | Zingher | |
| 5,909,544 A | 6/1999 | Anderson, II et al. | |
| 5,913,060 A | 6/1999 | Discavage | |
| 5,978,830 A | 11/1999 | Nakaya et al. | |
| 5,999,963 A | 12/1999 | Bruno et al. | |
| 6,006,248 A | 12/1999 | Nagae | |
| 6,009,455 A | 12/1999 | Doyle | |
| 6,078,955 A | 6/2000 | Konno et al. | |
| 6,085,276 A | 7/2000 | VanDoren et al. | |
| 6,094,686 A | 7/2000 | Sharma | |
| 6,131,093 A | 10/2000 | Maruyama et al. | |
| 6,202,080 B1 * | 3/2001 | Lu et al. ..................... | 709/105 |
| 6,213,652 B1 | 4/2001 | Suzuki et al. | |
| 6,286,003 B1 | 9/2001 | Muta | |
| 6,292,827 B1 | 9/2001 | Raz | |
| 6,370,560 B1 * | 4/2002 | Robertazzi et al. ......... | 709/105 |
| 6,397,252 B1 | 5/2002 | Sadiq | |
| 6,405,310 B1 | 6/2002 | Simpson | |
| 6,430,590 B1 | 8/2002 | Fischer | |
| 6,438,553 B1 | 8/2002 | Yamada | |
| 6,442,858 B1 | 9/2002 | Asano | |
| 6,466,980 B1 | 10/2002 | Lumelsky et al. | |

OTHER PUBLICATIONS

U.S. patent application Ser. No. 09/480,816, Krum, filed Jan. 10, 2000.

U.S. patent application Ser. No. 09/480,818, Krum, filed Jan. 10, 2000.

U.S. patent application Ser. No. 09/480,834, Krum, filed Jan. 10, 2000.

U.S. patent application Ser. No. 09/480,847, Krum, filed Jan. 10, 2000.

U.S. patent application Ser. No. 09/480,876, Krum, filed Jan. 10, 2000.

U.S. patent application Ser. No. 09/480,885, Krum, filed Jan. 10, 2000.

U.S. patent application Ser. No. 09/481,009, Krum, filed Jan. 10, 2000.

U.S. patent application Ser. No. 09/481/101, Krum, filed Jan. 10, 2000.

U.S. patent application Ser. No. 09/480,185, Laverty et al., filed Jan. 10, 2000.

U.S. patent application Ser. No. 09/480,332, Laverty et al., filed Jan. 10,2000.

U.S. patent application Ser. No. 09/480,334, Laverty et al., filed Jan. 10, 2000.

U.S. patent application Ser. No. 09/480,335, Laverty et al., filed Jan. 10, 2000.

U.S. patent application Ser. No. 09/480,550, Laverty et al., filed Jan. 10, 2000.

U.S. patent application Ser. No. 09/480,645, Laverty et al., filed Jan. 10, 2000.

U.S. patent application Ser. No. 09/480,821, Laverty et al., filed Jan. 10, 2000.

U.S. patent application Ser. No. 09/480,866, Laverty et al., filed Jan. 10, 2000.

U.S. patent application Ser. No. 09/480,980, Laverty et al., filed Jan. 10, 2000.

U.S. patent application Ser. No. 09/480,987, Laverty et al., filed Jan. 10, 2000.

U.S. patent application Ser. No. 09/481,007, Laverty et al., filed Jan. 10, 2000.

Narendran, B. et al., "Data Distribution Algorithms for Load Balanced Fault–Tolerant Web Access," *Proceedings of the Symposium on Reliable Distributed Systems* at Los Alamitos, California, Oct. 27, 1997, pp. 97–106, IEEE Computer Soc.

Deplanche, Anne–Marie and Elloy, Jean–Pierre, "Task Redistribution with Allocation Constraints in a Fault–Tolerant Real–Time Multiprocessor System," *Distributed Processing—Proceedings of the IFIP WW6 10:3 Working Conference,* Oct. 1987, pp. 133–150.

* cited by examiner

| Estimated Execution Times | Computer Resource Load | | | | |
|---|---|---|---|---|---|
| | | 1-10 | 11-20 | 21-30 | ... | 91-100 |
| Job Size | 1-10 | .49 | .5 | .51 | | .58 |
| | 11-20 | .75 | .76 | .77 | | |
| | ... | | | | | |
| | 91-100 | 3.2 | 3.3 | 3.4 | | 4.1 |

*Fig. 9*

METHOD FOR CONFIGURING AN APPLICATION SERVER SYSTEM

CROSS-REFERENCE

This Patent Application incorporates by reference provisional application No. 60/131,716, entitled "A Consistent PostScript System," filed on Apr. 30, 1999; the provisional application No. 60/152,521, entitled "Color Washing of Graphic Image Files," filed on Sep. 3, 1999, and the following patent applications filed on Jan. 10, 2000:

| Application No. | Title |
| --- | --- |
| 09/480,334 | Method for Washing of Graphic Image Files |
| 09/480,821 | Trapping of Graphic Image Files |
| 09/480,550 | Imposition of Graphic Image Files |
| 09/480,332 | Color Separation of Graphic Image Files |
| 09/480,869 | PostScript to Bitmap Conversion of Graphic Image Files |
| 09/480,881 | PostScript to PDF Conversion of Graphic Image Files |
| 09/481,372 | PDF to PostScript Conversion of Graphic Image Files |
| 09/480,335 | Automated, Hosted Prepress Applications |
| 09/480,645 | Apparatus for Washing of Graphic Image Files |
| 09/480,185 | Load Balancing of Prepress Operations for Graphic Image Files |
| 09/480,987 | Trapping of Graphic Image Files |
| 09/480,980 | Imposition of Graphic Image Files |
| 09/481,007 | Color Separation of Graphic Image Files |
| 09/480,820 | PostScript to Bitmap Conversion of Graphic Image Files |
| 09/481,010 | PostScript to PDF Conversion of Graphic Image Files |
| 09/480,333 | PDF to PostScript Conversion of Graphic Image Files |
| 09/480,866 | Automated, Hosted Prepress Applications |

TECHNICAL FIELD

The present disclosure relates generally to computer systems and, more particularly, to techniques for handling high volumes of processing requests.

BACKGROUND

Many computer systems have been developed to handle high volumes of processing requests from users. In transaction-oriented environments, there is a need to process very high volumes of transactions quickly. Traditionally, such processing requests were handle by a single mainframe computer system. Users of such mainframe computer systems would submit processing requests (e.g., making an airline reservation) from either local or remote terminals. The ability to handle such processing requests or transactions in a timely manner was limited by the resources of the computer system. As a result, mainframe computer systems were designed and developed with ever-increasing amounts of computing resources. For example, the speed of CPUs and the speed and amount of memory has increased dramatically over time. Nevertheless, the actual computing resources of such mainframe computer systems seemed to always lag behind the users needs for computing resources.

Because single mainframe computers were unable to satisfy the users' requirements and because of their high cost, multi-computer systems were developed to help satisfy the requirements. The computing resources of such multi-computer systems can be increased by adding additional computers to the system. Thus, the architectures of the multi-computer systems were in some sense scalable to provide ever-increasing computer resources. A problem with such multi-computer systems has been the high overhead associated with the systems. The high overhead stems from the processing required for the computers to coordinate their activities.

The popularity of the Internet has significantly increased the need for computing resources. A web server may be accessed by thousands and tens of thousands of users each day. These users may require that significant computing resources be expended to satisfy their requests. Current techniques of multi-computer systems are inadequate to handle such a high demand for computing resources. It would be desirable to have a multi-computer system that can handle the increased demand. Also, it would be desirable to reduce the overhead associated with such multi-computer systems.

BRIEF DESCRIPTION OF THE DRAWINGS

FIG. 9 is a matrix containing execution times for various combinations of a job sizes and computer resource loads.

DETAILED DESCRIPTION

Figure 1:
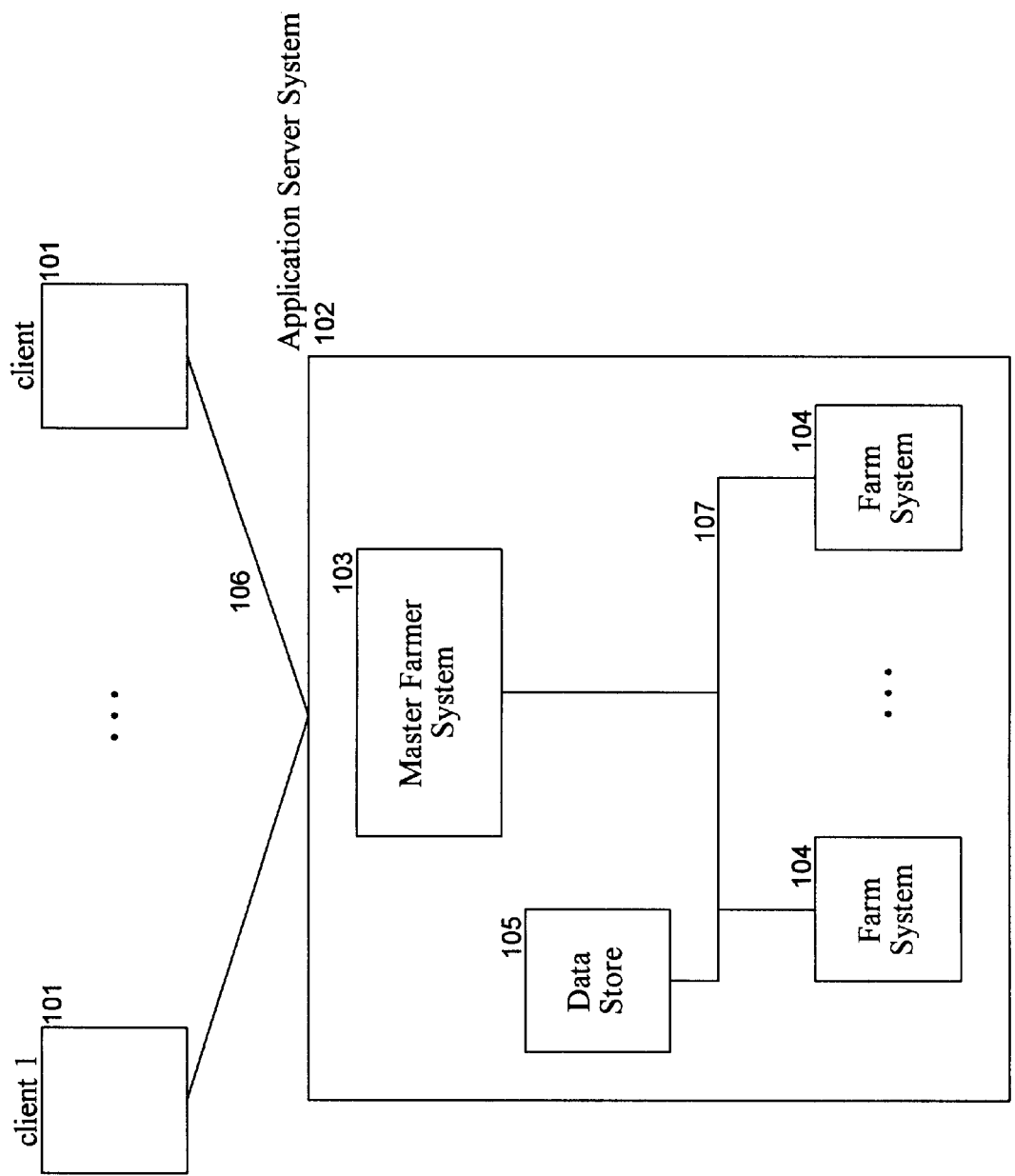
FIG. 1 is a block diagram illustrating the components of the application server system in one embodiment.

A method and system for processing requests to service computational tasks is provided. In one embodiment, an application server system receives requests to run various jobs. A job indicates that a certain application program is to be executed with a certain set of input. The application server system includes a master computer and multiple slave computers. The master computer receives requests to run jobs, selects a slave computer to run each job, and then assigns each job to slave computer selected for that job. The master computer of the application server system receives the requests from client computers that may be connected to the application server system via the Internet. A client-side component of the application server system may execute on the client computers to assist users in submitting their requests. One advantage of this application server system is that slave computers may be dynamically added to or removed from the application server system as the demand for computing resources changes. Another advantage is the very low overhead associated with distributing jobs to slave computers.

The application server system uses various techniques to ensure that jobs are completed as soon as possible given the current load of the application server system. In one embodiment, when the application server system receives a request to run a job, it estimates the time at which each slave computer could complete the job. The master computer then assigns the job to the slave computer that can complete the job the soonest. The application server system may estimate the completion times using actual execution statistics of other jobs for the same application program. By using the actual execution statistics of other jobs, the application-server system can estimate completion times that are more accurate and reflect the actual computing resources of the slave computers.

To estimate a completion time for a slave computer, the application server system first determines a start time for the job and then determines the time it will take to run the job on that slave computer. The application server system estimates the time it will take to run the job on a slave computer based on the "size" of the job and the estimated "load" on the slave computer at the time the job would run on that slave computer. Each job is assigned a size that reflects a grouping of jobs that are anticipated to use the same amount of computing resources when they run. Thus, the application server system estimates the execution time of a job based on actual execution statistics for jobs in the same group.

The possible sizes may range from 1 to 100, where the largest possible job for an application program is assigned a size of 100, and the smallest possible job for that application program is assigned a size of 1. Thus, all jobs with the same size (e.g., a size of 20) are assumed to use the same amount of computing resources. Each application is also assigned an "application program load" that reflects an estimate of the computing resources (e.g., percentage of CPU) used by the application program during execution. For example, an application program may be given an application program load of 25 if it typically consumes 25 percent of the computing resources when it is the only application program executing on a slave computer. If each slave computer has the same computing resources (e.g., same number of processors and same processor speed), then one application program load number can be used for each application program on all slave computers. However, if the computing resources of the slave computers differs, then each slave computer could have its own application program load for each application program. The "computing resource load" of a slave computer reflects the amount of computing resources that are being used or would be used when a certain set of application programs are being executed at the same time (or concurrently) on that slave computer. The computing resources load may reflect a percentage of the CPU that is being used. Thus, the computing resource load may range from 1 to 100 percent.

The application server system determines the time it would take to run a job of a slave computer ("execution time") based on review of actual statistics from other jobs for the same application program. In one embodiment, the application server system tracks for each application program the actual execution time of its jobs, the slave computer on which the job ran, and the computing resource load of the slave computer while the job ran. The application server system assumes that similar jobs, that is jobs for the same application program with the same size, will have the same execution time if the job is run in a similar slave environment, that is on the same slave computer with the same computing resource load. Thus, if the actual execution time in a similar slave environment is available for such a similar job, then the application server system uses the actual execution time as an estimate. When such statistics are not available for a similar job that ran in a similar slave environment, the application server system estimates the execution time based on the actual execution time of similar jobs, but in different slave environments. For example, if the actual execution time for a job was 10 seconds with a computing resource load of 50 percent, then the application server system may estimate the execution time of a similar job to be 8 seconds when the computing resource load is 25 percent.

The application server system determines the computing resource load of a slave computer based on the application program loads of the application programs that will be executing at the time. In one embodiment, the application server system identifies which application programs will be executing at the time and then totals the application program loads of the application programs. For example, if 3 jobs will be running at the time and 2 jobs are for an application program with an application program load of 10 and the other job is for an application program with an application program load of 5, then the computing resource load at that time will be 25.

The application server system determines the start time of a job on a slave computer based on the estimated completion times of jobs currently assigned to that slave computer for the same application program. The application server system may track the estimated completion time of each job assigned to a slave computer that has not yet completed. Each slave computer may be configured so that only a certain number of instances of each application program can be executing at the same time. When a slave computer is assigned a job by the master computer, it may queue the assigned job if there is already the configured number of instances of the application program executing. The application server system may determine the start time based on review of the estimated completion times for the currently executing jobs and the queued jobs for that application program. In particular, the start time is the time at which the number of instances would drop below the configured number of instances.

FIG. 1 is a block diagram illustrating the components of the application server system in one embodiment. The application server system 102 is connected to client computers ("clients") 101 via communications link 106. A client may be a computer system through which jobs may be submitted to the application server system. For example, a client may be a personal computer with an Internet browser through which a user interacts to select and submit jobs to the application server system. A client may also be an automated system that interacts directly with the application server system. The client may include a client-side component of the application server system. The client-side component may assist the user in defining a job (e.g., selecting an application and specifying the input and output files) and submitting the job. The client-side component may also provide the user with updates on the progress of the jobs that have been submitted. The communications link may be the Internet, local area network, a dial-up link, or any other communications link. In the following, an agricultural metaphor is used to describe the components of the application server system. The application server system includes a master farmer system 103, farm systems 104, and a data store 105, which are connected via communications link 107. The master farmer system (e.g., a master computer) receives requests to submit jobs from clients, identifies a farm system (e.g., slave computer) to run the job, and instructs the identified farm system to run the job. When a farm system receives an instruction to run a job, it queues the job until an instance of the application program is available to run that job. When the job runs, it retrieves input data from and stores output data in the data store. The data store may be a file system, database management system, or other storage system.

The computers of the application server system and the clients may be computing devices that include one or more, central processing units, memory, and various input/output devices. The memory may include primary and secondary storage and other computer-readable media. The modules, routines, components, and so on of the application server system may be implemented as a computer program comprising executable instructions. The computer programs and data structures of the application server system may be stored on computer-readable medium. The computer-readable medium may include a data transmission medium (e.g., the Internet) for transmitting the computer programs, data structures, and inter-computer communications from one computer to another. The application programs served by the application server system may be any type of computer program.

Figure 2:
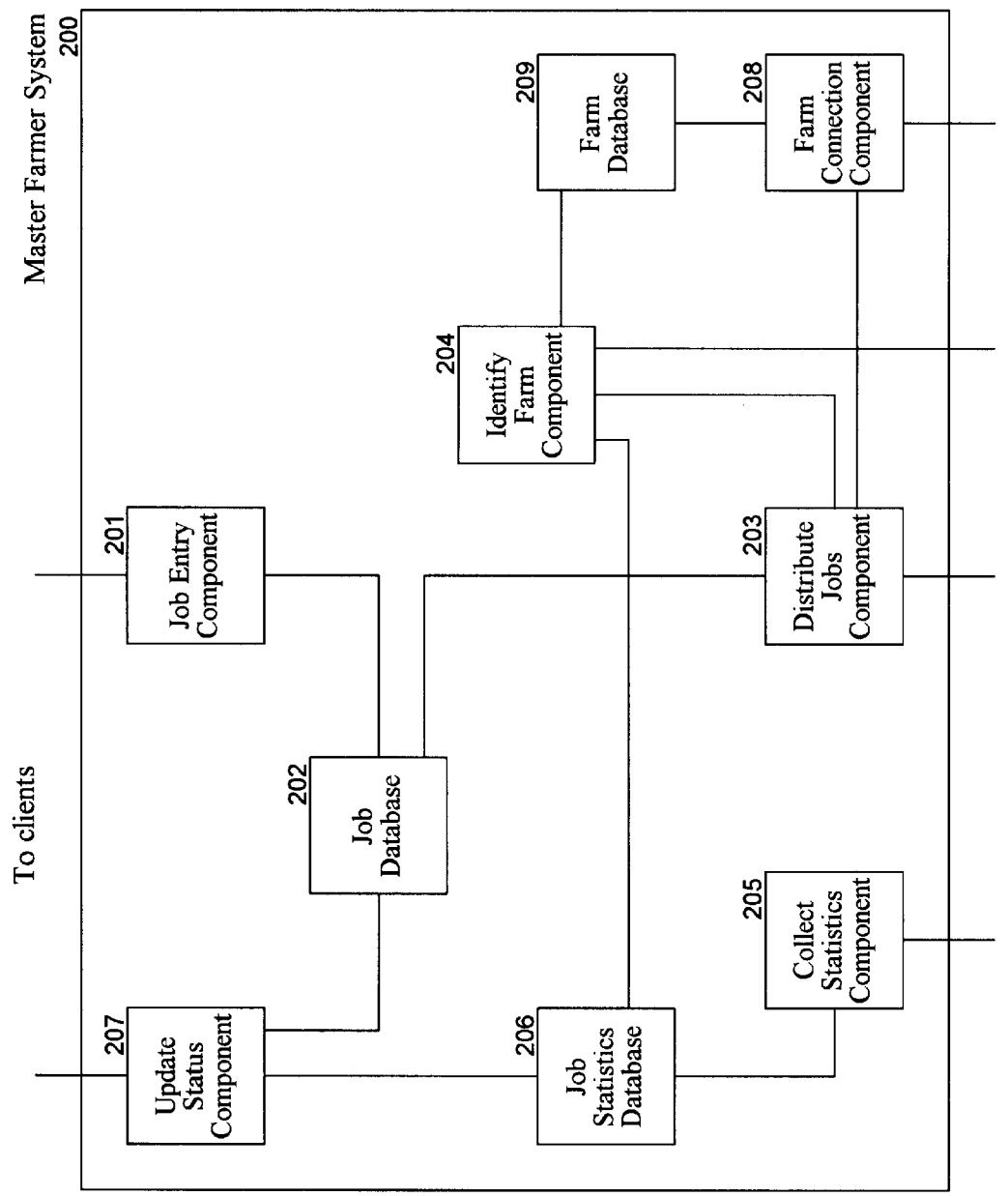
FIG. 2 is a block diagram of the components of the master farmer system in one embodiment.

FIG. 2 is a block diagram of the components of the master farmer system in one embodiment. The master farmer system 200 includes a job entry component 201, a job database, 202, a distribute jobs component 203, an identify farm component 204, a collect statistics component 205, a job statistics database 206, an update status component 207, a farmer connection component 208, and a farmer data base 209. These components and databases represent the finctions performed by and data used by the master farmer system. The job entry component interfaces with the clients to receive request to run jobs. The job entry component may provide a client with a list of available application programs and input files. The client may submit a job, which is a combination of an application program and input files, to be run. When the job entry component receives the submission of the job, it may update the jobs database and provide the job to the distribute jobs component. The distribute jobs component is responsible for identifying to which farm system a job should be assigned. The distribute jobs component invokes the identify farm component to identify the farm system to which the job should be assigned. The identify farm component may select a farm system based on characteristics (e.g., size) of the job and statistics in the job statistics database that relate to the similar jobs or may rely on information provided by the slave computers. Once the identify farm component selects a farm system, the distribute jobs component notifies the identified farm system that the job has been assigned to it. The collect statistics component retrieves statistical information on the execution of jobs from the farm system and then updates the job statistics database. For example, the job statistics database may contain information describing each job, the job size, the farm system on which it ran, the actual execution time of the job, and the computing resource load on the farm system at the time the job ran. The identify farm component may use these and other statistics to identifying the farm system to which a job is to be assigned. Alternatively, the identify farm component may provide each farm system with an indication of the job and request it to provide an estimate of the completion time. The update status component monitors the running of jobs and provides update information on the progress of the jobs to the clients. The farm connection component receives requests from farm systems to establish or break a connection with the master farmer system. The farm connection component may also monitor the farm systems to determine whether a connection with a farm system has been broken because the farm system has failed. When a connection is broken, the farm connection component may direct the distribute jobs component to assign the uncompleted jobs of that farm system to other farm systems. The farm connection component maintains the farm database which contains information describing the farm systems that are currently connected to the master farm system. The farm database may contain an identification of each farm system (e.g., address) along with an indication of the application programs that each farm system can execute.

Figure 3:
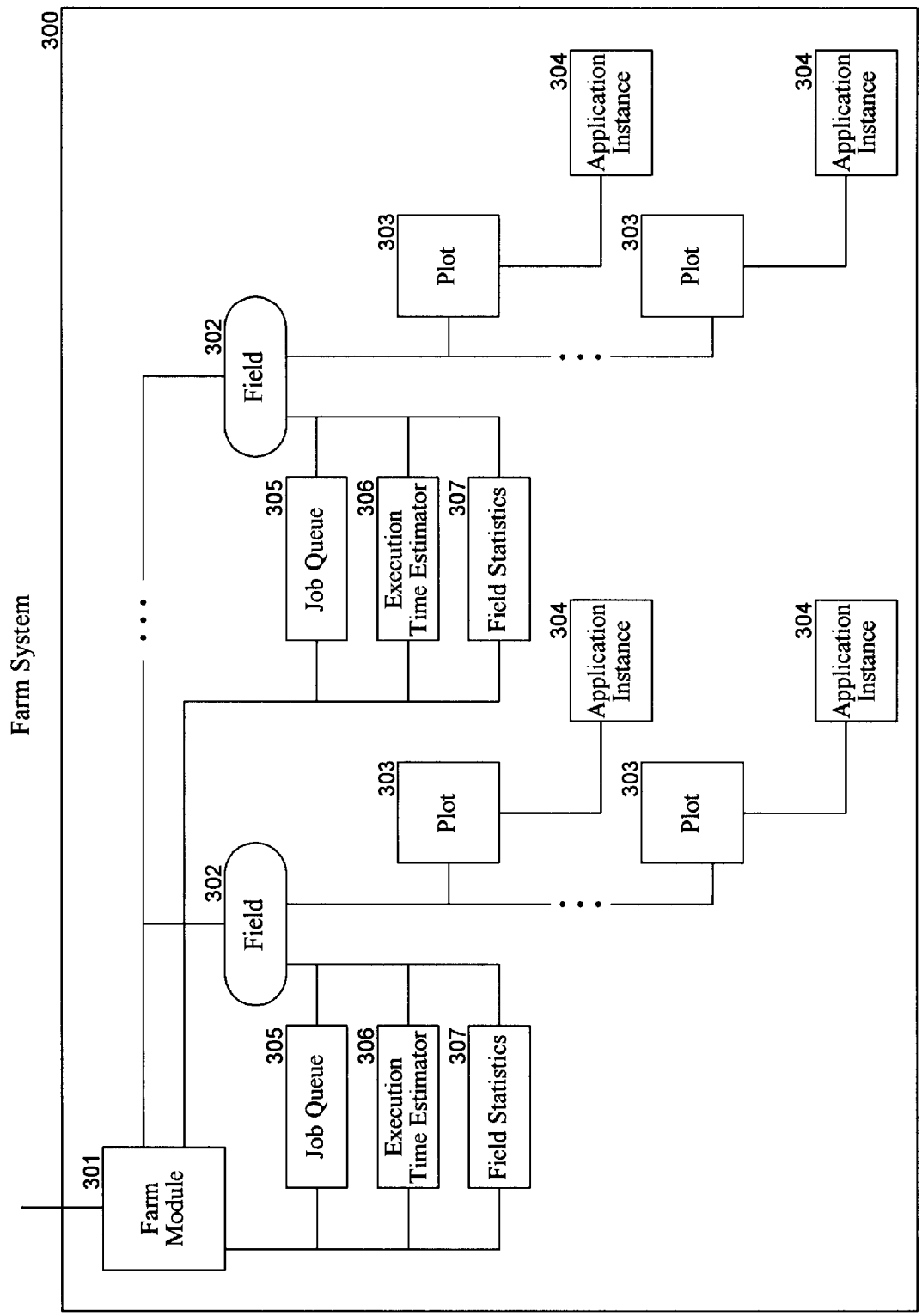
FIG. 3 is a block diagram illustrating the components of a farm system in one embodiment.

FIG. 3 is a block diagram illustrating the components of a farm system in one embodiment. The farm system 300 includes a farm module 301 and a field component 302 for each application program that the farm system can execute. When the farm system is assigned a job by the master farmer system, it queues the job to be run by the appropriate field component. Each field component has a job queue 305 associated with it. In one embodiment, the field components execute within the same process as the farm module. For example, each field component may be a dynamic link library that is automatically loaded into the same process as the farm module when the farm module is launched. When a farm module is launched, it may check which field components to load. Each field component may be customized to watch and monitor jobs for a particular application program. Each field component may be configured to have at most a certain number of instances of its application program executing concurrently. When the field component detects that a job is in its queue, it determines whether that configured number of instances is currently executing. If not, the field component launches a plot component to launch and monitor an instance of the application program for the job. The plot component detects when the instance is no longer executing and notifies the field component. The field component may collect statistics about the running of each job and store the statistics in the field statistics database 307. The farm module may periodically supply statistics to the master farmer system. When the master farm system is identifying a farm system to assign to a job, the master farm system may request a farm system to estimate the completion time of that job if assigned to it. The farm system uses the completion time estimator 306 to generate the estimate.

Figure 4A:
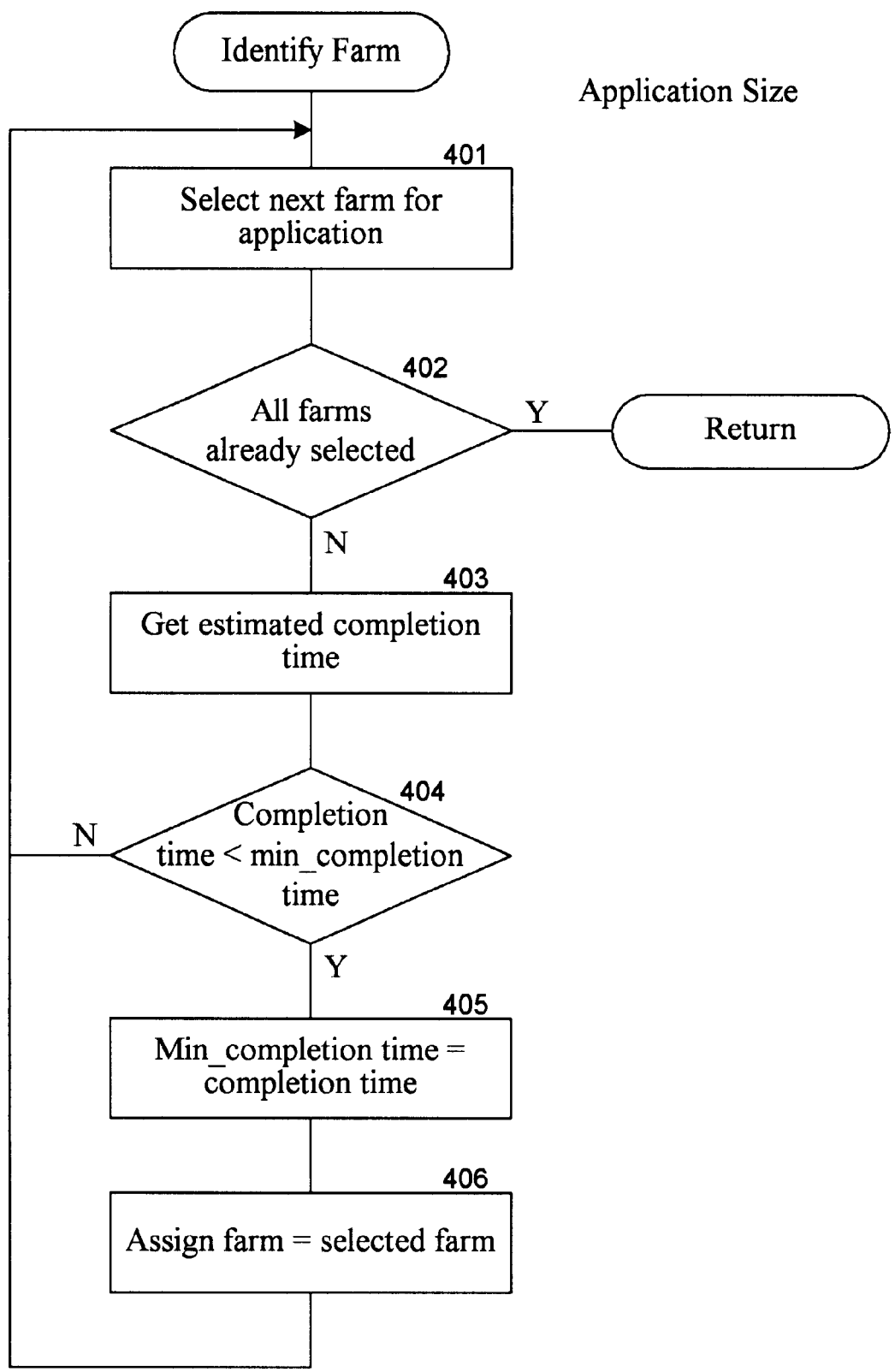
FIG. 4A is a flow diagram of a routine illustrating the processing of an identify farm component of the master farmer system.

FIG. 4A is a flow diagram of a routine illustrating the processing of an identify farm component of the master farmer system. The identify farm component selects the farm system to which a job is to be assigned. In one embodiment, the routine selects the farm system that is estimated to complete the job soonest. The master farmer system may maintain sufficient information to calculate an estimated completion time for each farm system. Alternatively, the master farm system may provide each farm system with an indication of a job and request the farm system to provide an estimated completion time. The flow diagram of FIG. 4A illustrates the processing of the routine for a master farm system that requests each farm system to supply an estimated completion time. In blocks 401–406, the routine loops selecting each farm system to which the job can be assigned. A job can be assigned to any farm system that can execute the application program of the job. In block 401, the routine selects the next farm system to which the job can be assigned. The farm database may contain a mapping from each farm system to the application programs that it is configured to execute. In decision block 402, if all the farm systems have already been selected, then the routine is done, else the routine continues at block 403. In block 403, the routine requests the selected farm system to provide an estimated completion time for the job. In decision block 404, if the completion time is less than the minimum completion time estimated for any previously selected farm system, then the routine continues at block 405, else the routine loops to block 401 to select the next farm system. In block 405, the routine sets the minimum completion time to the estimated completion time for the selected farm system. In block 406, the routine identifies the selected farm system as having the soonest completion time. The routine then loops to block 401 to select the next farm system.

Figure 4B:
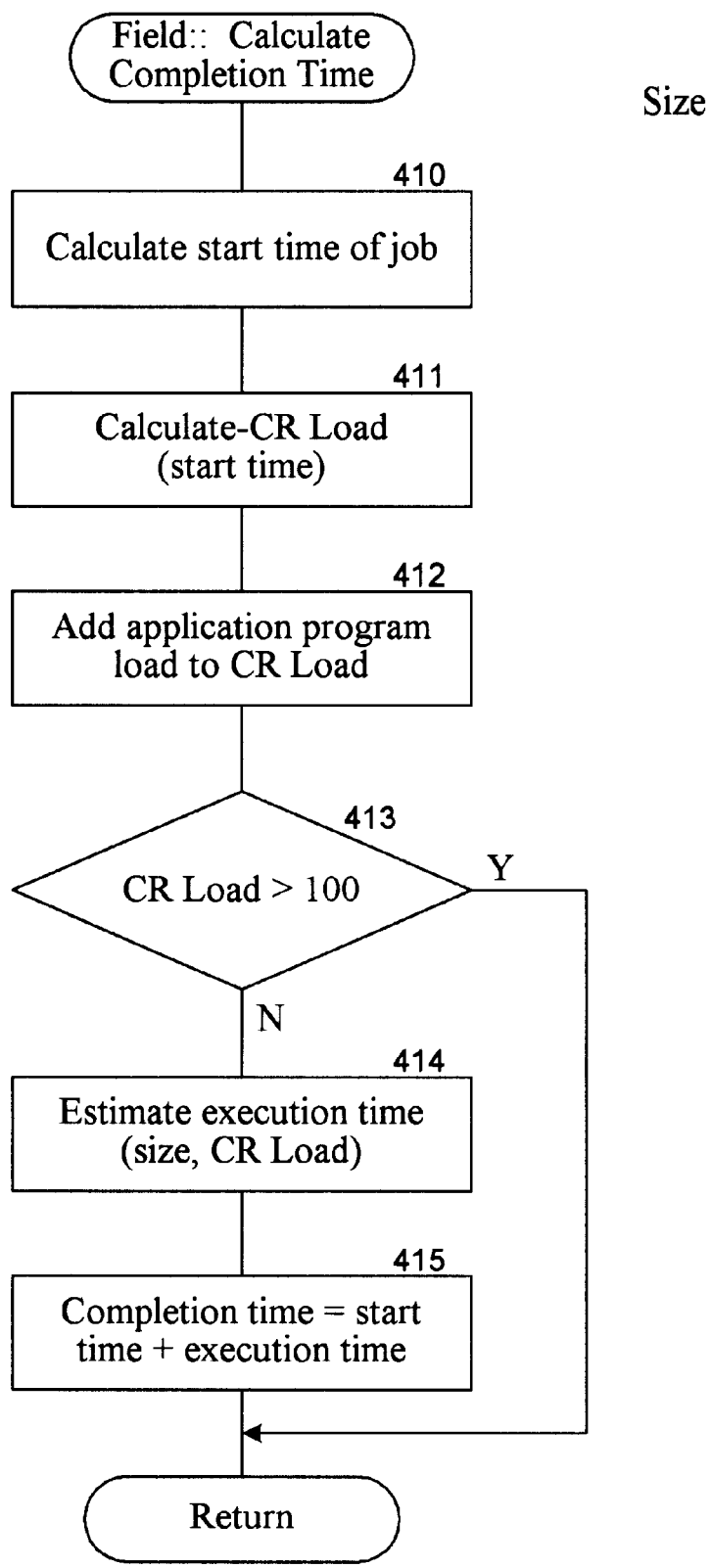
FIG. 4B is a flow diagram illustrating processing of a routine that calculates an estimated completion time.

FIG. 4B is a flow diagram illustrating processing of a routine that calculates an estimated completion time. This routine is invoked by a field component after the farm module of the farm system receives a request to provide an estimated completion time. The routine is passed the size of the job. In block 410, the routine calculates the start time for the job. The start time may be initially calculated based on the completion times of the jobs currently assigned to the field component. The initial start time may be calculated by identifying when a plot component will be first available for running the job. A plot component will first be available depending on the number of plot components configured for the field component. For example, if the field component has been allocated five plot components, then the initial start time will be the fifth latest completion time of the job assigned to the field component. That is, when the job with the fifth latest completion time completes, then a plot component will be available to assign to the job. However, the job may not necessarily be able to start at that time. In particular, if the application program load would cause the farm system to exceed its maximum computing resource load at some point during its execution, then the farm system may decide that the job should not be started at that time. In such a case, the routine may return an indication that the job cannot be assigned to, the farm system. Alternatively, the routine may analyze the jobs assigned to each field component to determine the earliest time when the job can execute without causing the farm system to exceed its maximum computing resource load and return that time as the start time. In block 411, the routine invokes a calculate computing resource load routine to calculate the computing resource load on the farm system at the start time. In block 412, the routine adds the load to the calculated computing resource load to give the estimated computing resource load for the farm system while the job is running. In decision block 413, if the computing resource load is greater than 100, then the routine returns an indication that the job cannot be assigned to this farm system, else the routine continues at block 414. In block 414, the routine calculates the execution time for the job based on the estimated computing resource load and the job size. Various techniques for calculating the estimated execution time are described below. In block 415, the routine calculates the estimated completion time by adding the start time to the execution time. The routine then completes.

Figure 5:
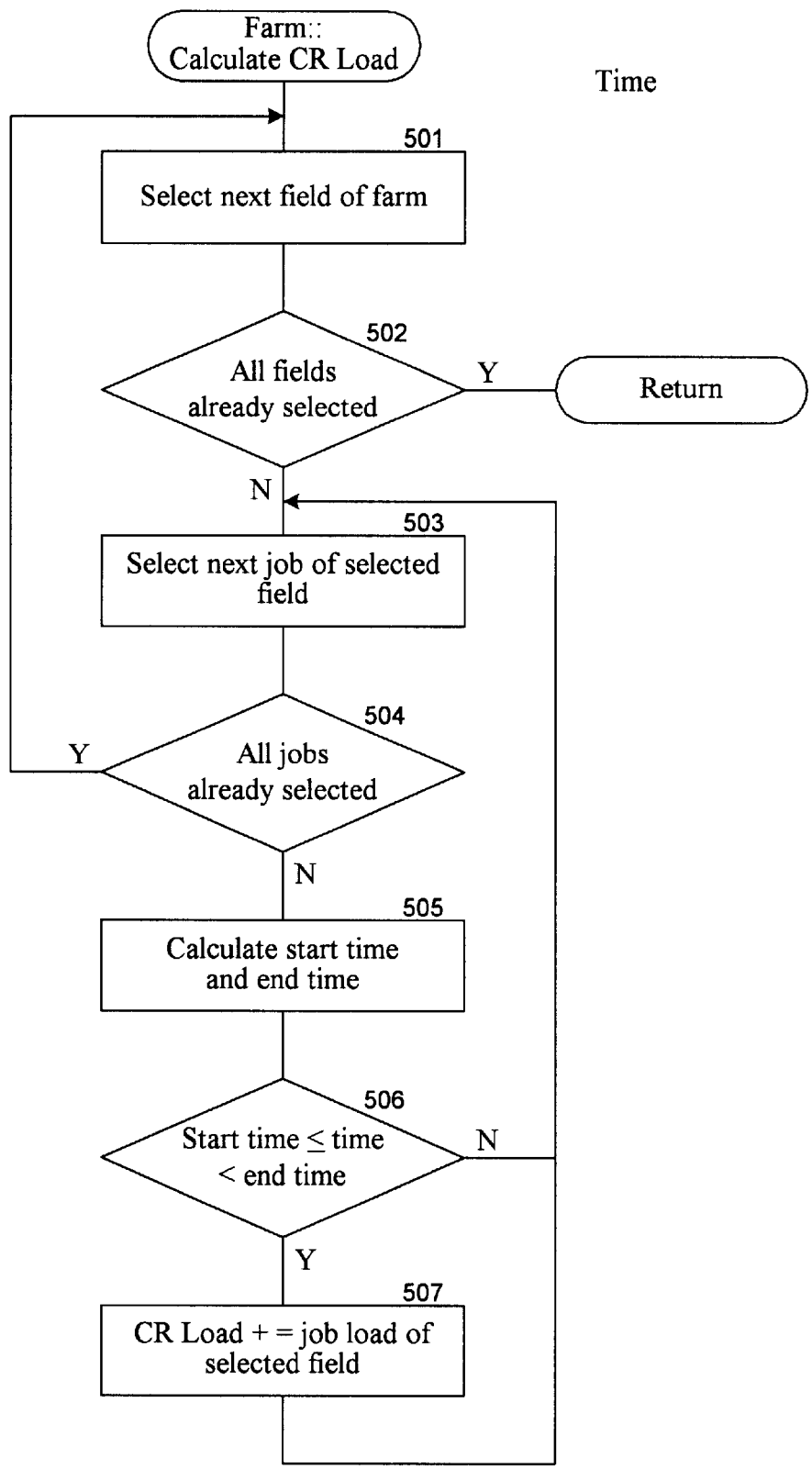
FIG. 5 is a flow diagram illustrating a routine for calculating a computing resource load for a farm system.

FIG. 5 is a flow diagram illustrating a routine for calculating a computing resource load for a farm system. This routine is passed an indication of a time. The routine calculates the computing resource load to be the total of the application program loads of each job that is scheduled to be executing at that time. In blocks 501–507, the routine loops selecting each field component of the farm system and adding the application program loads for the jobs of that field component that will be executing at the time. In block 501, the routine selects the next field component of the farm system. In decision block 502, if all the field components have already been selected, then the routine returns, else the routine continues at block 503. In blocks 503–507, the routine loops selecting each job currently assigned to the selected field component. A job is currently assigned to a field component if it is currently running or queued up to run in that field component. In block 503, the routine selects the next job of the selected field component. In decision block 504, if all the jobs have already been selected, then the routine loops to block 501 to select the next field component of the farm system, else the routine continues at block 505. In block 505, the routine retrieves the start time and completion time of the selected job. The start and completion times may be stored in a data structure associated with the job. In decision block 506, if the selected job will be executing at that passed time, then the routine continues at block 507, else the routine loops to block 503 to select the next job. In block 507, the routine adds the application program load of the selected job to the computing resource load for the farm system and then loops to block 503 to select the next job.

Figure 6:
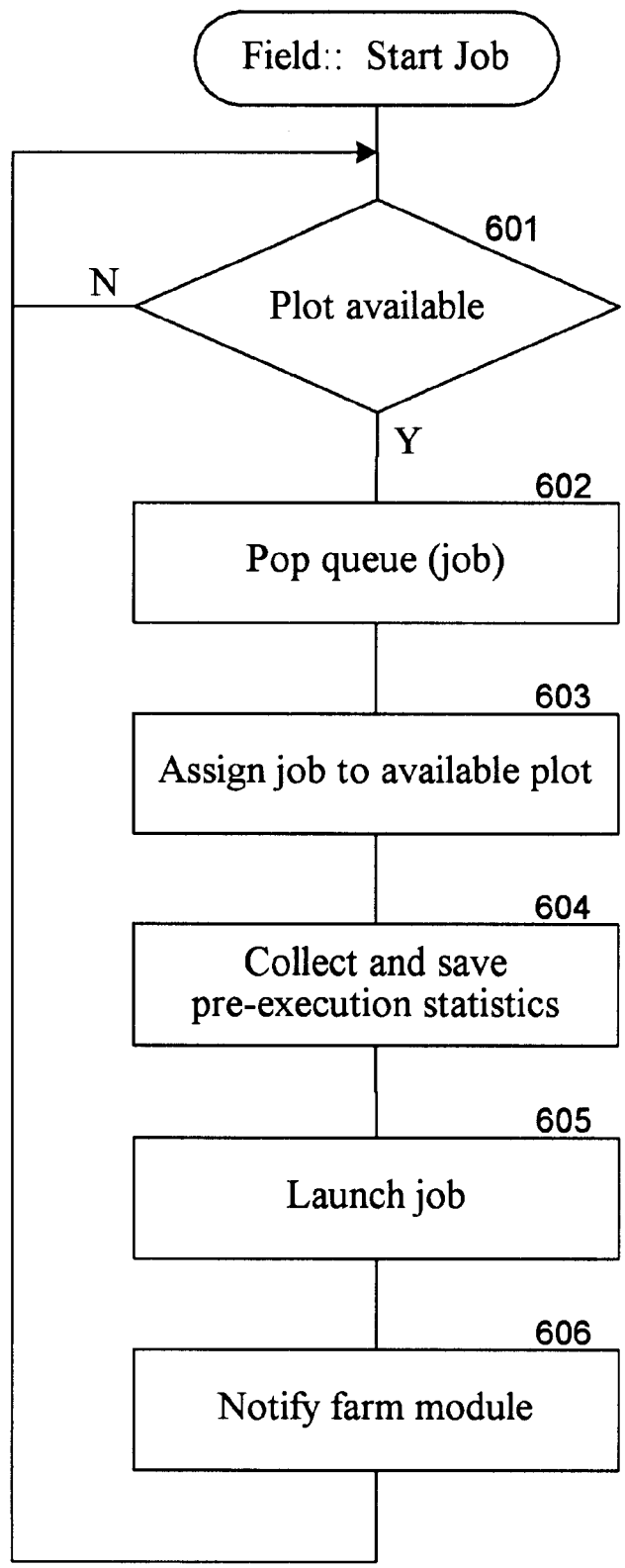
FIG. 6 is a flow diagram illustrating the processing of a routine of the field component for starting jobs.

FIG. 6 is a flow diagram illustrating the processing of a routine of the field component for starting jobs. This routine may loop waiting for a plot component to become available. When a plot component becomes available, the routine then retrieves the next job from the queue and assigns it to a plot component. In decision block 601, if a plot component is currently available, then the routine continues at block 602, else the routine loops to wait for an available plot component. Alternatively, this routine may be invoked whenever a plot component becomes available or whenever a new job is placed in the queue. If either a job is not in the queue or a plot component is not available, then the routine would return without waiting. In block 602, the routine retrieves the next job from the queue. If there is no job in the queue, then the routine waits until a job is placed in the queue. In block 603, the routine assigns the job to an available plot component. In block 604, the routine collects and saves pre-execution statistics relating to the job. For example, the routine may store the job size, the start time of the execution, and the current computing resource load of the farm system. In block 605, the routine launches the job. The routine may launch a job by launching a plot component to run in a process separate from the process of the farm module. The routine passes an indication of the job to the plot component. The plot component starts an instance of the application program passing an indication of the input. In block 606, the routine notifies the farm module that the job has begun its execution. The routine then loops to block 601 to assign a job to the next available plot.

Figure 7:
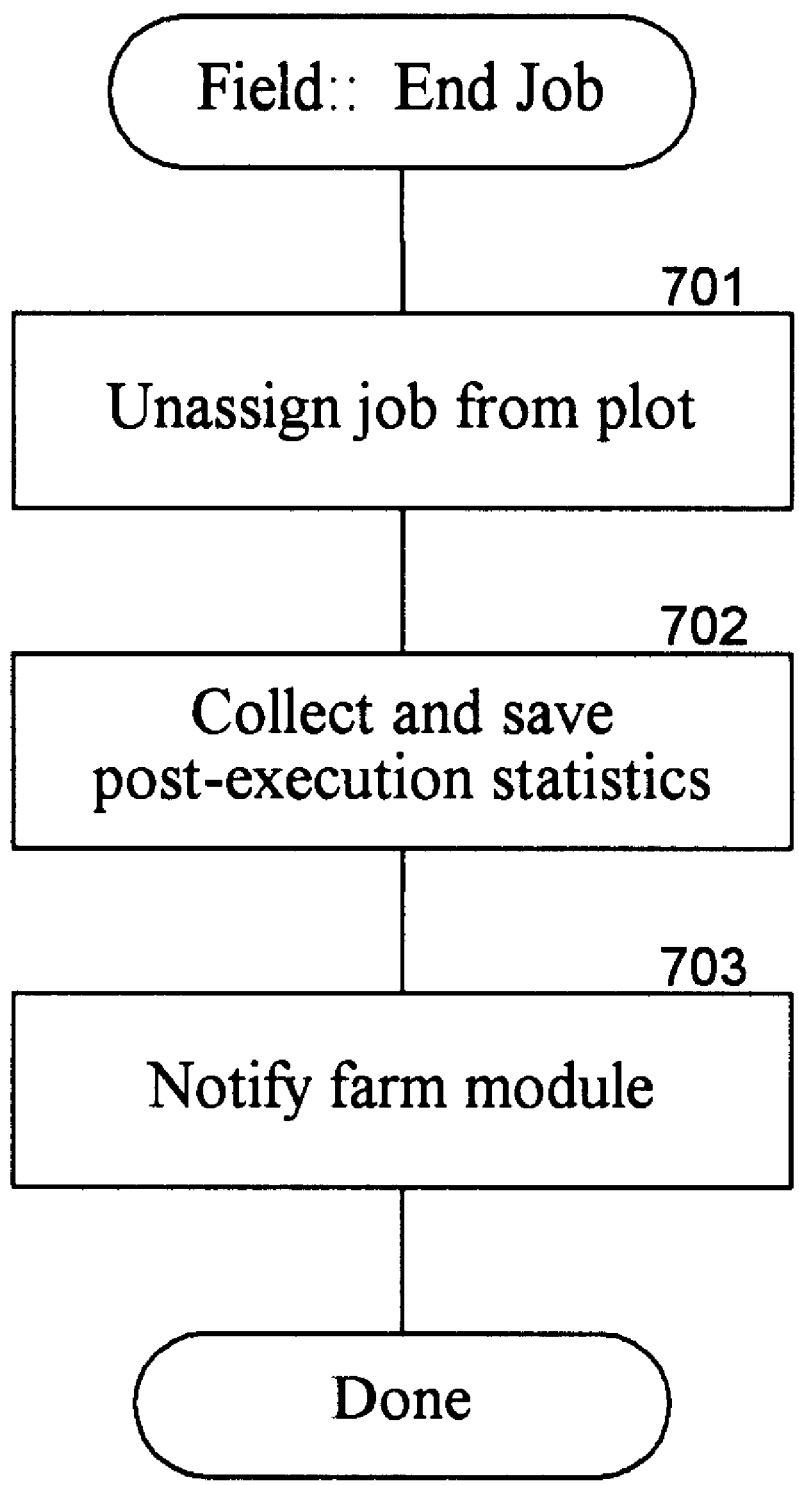
FIG. 7 is a flow diagram of an end job routine of the field component.

FIG. 7 is a flow diagram of an end job routine of the field component. The end job routine is invoked whenever a plot component indicates that it is ending its execution. A plot component may end its execution for various reasons including normal or abnormal termination of the application program. In block 701, the routine unassigns the job from the plot component, which makes the plot component available to execute another job. In block 702, the routine collects and saves post-execution statistics relating to the job. The statistics may include the time at which the job completed. In block 703, the routine notifies the farm module that the job has completed. The routine then completes.

Figure 8:
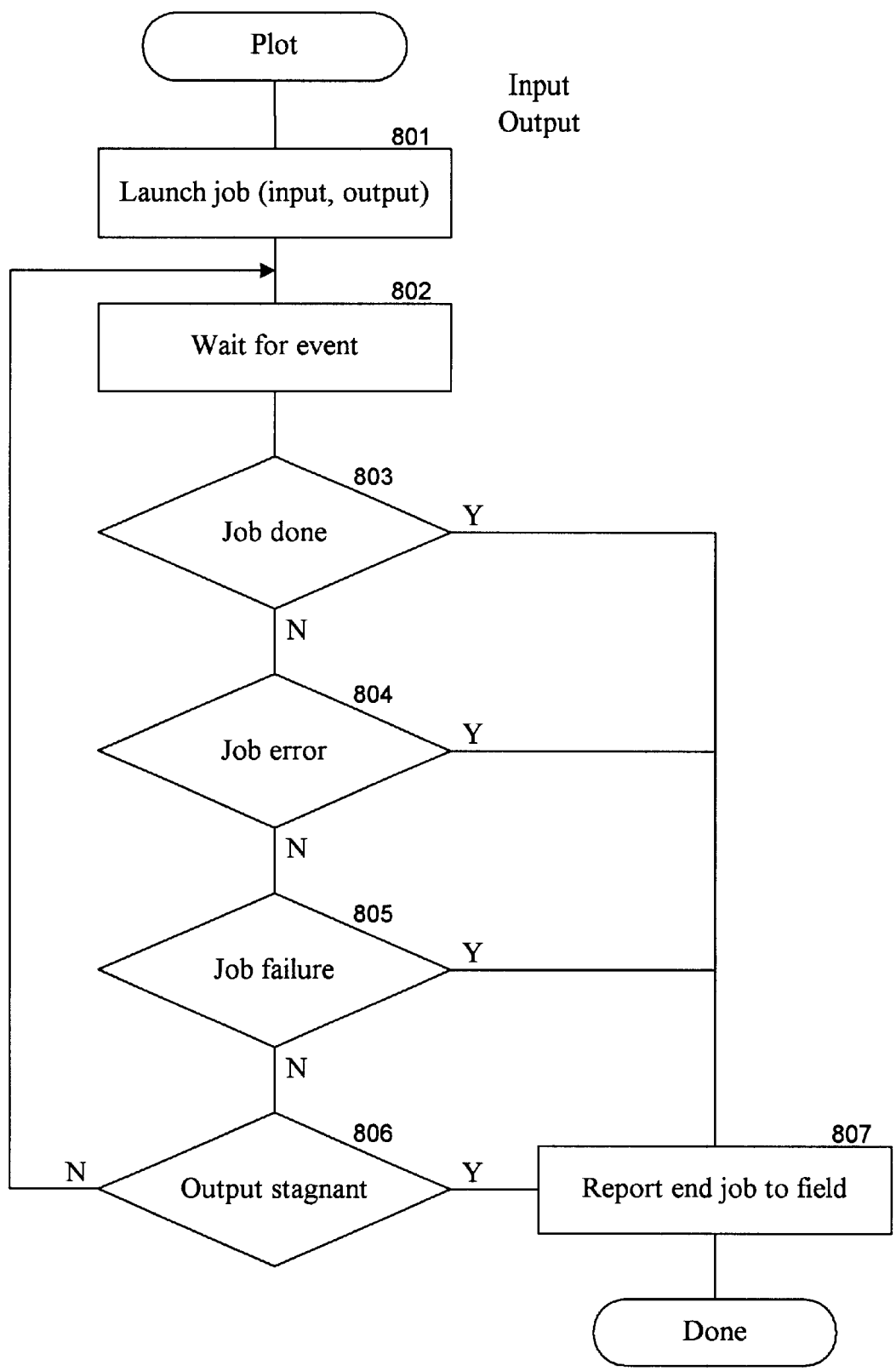
FIG. 8 is a flow diagram of a routine illustrating the processing of a plot component.

FIG. 8 is a flow diagram of a routine illustrating the processing of a plot component. A plot component may be a custom program for controlling the execution of a certain application program. The input to this routine may be an indication of the input and output files for the application program. In block 801, the routine launches an instance of the application program. The application program may be launched by creating a new process for executing the application and passing an indication of the input and the output to that process. Alternatively, the application program may be launched by creating a thread of execution within the same process in which the plot component is executing. The application program may be a dynamic link library that is loaded by the plot component. In blocks 802–806, the routine loops processing events relating to the execution of the application program. A plot component may be notified of certain events relating to the application program. For example, the application program may notify the plot component that it is terminating normally or that it has detected a failure. The plot component may also be notified when the application program terminates as a result of a programming error (e.g., causing a system fault). In one embodiment, the plot component may periodically check the output file of the application program to determine whether it is being modified. If the output file is not modified for certain period of time, then the plot component may assume that the application program is not functioning as expected. In block 802, the routine waits for notification of an event. In decision blocks 803–806, the routine determines whether a termination event has occurred. If so, the routine continues at block 807, else the routine loops back to wait for the next event. In block 807, if the application program is still executing, the routine forces the instance of the application program to abort. The routine then reports that the job has ended to the field component along with the reason for ending.

FIG. 9 is a matrix containing execution times for various combinations of a job sizes and computer resource loads. Each field component may have such an execution time matrix associated with it. The field components use this matrix when estimating execution times of application programs. The matrix includes a row for each group of job sizes. In this example, job sizes 1–10 are grouped together, job sizes 11–20 are grouped together, and so on. The matrix includes a column for each grouping of computing resource loads. In this example, computing resource loads 1–10 are grouped together, computing resource loads 11–20 are grouped together, and so on. One skilled in the art will appreciate that different groupings of the job sizes and computer resource loads may be used depending on the desired accuracy of execution times. For example, the computing resource loads may be grouped into 100 groups to have a more refined execution time. When the farm system needs to determine an estimated execution time for a job with a job size of 15 running with a computing resource load of 25, the farm system retrieves the execution time of 0.77 from the row corresponding to the job sizes 11–20 and the column corresponding to the computing resource load of 21–30.

In one embodiment, a field component updates the estimated execution times in the matrix whenever a job completes. The field component calculates the actual execution time of the job based on the actual start time and completion time for the job. The field component then calculates the computing resource load of the farm system during execution of that job. The farm system may periodically retrieve and store the actual computing resource load of the farm system. Some computer systems may specify that certain registers will contain various indications of computing resource loads. For example, one computer system may continually update a register to indicate the percentage of the CPU that was used over a very short interval. The farm module may use this percentage as the actual computing resource load. To estimate the computing resource load while a job ran, the field component averages actual computing resource loads recorded by the farm module while the job ran.

The field component, in one embodiment, updates the matrix by replacing an entire row whenever a job completes.. For example, when a job of size 15 completes, then the field component updates each execution time in the row corresponding to job sizes 11–20. The field component sets the estimated execution time for that job size and the calculated computing resource load to the actual execution time of the job. For example, if the job size was 15, the calculated computer resource load was 25, and the actual execution time was 0.82, then the field component would replace the 0.77 of the matrix with 0.82. The field component may also project that 0.82 execution time to the other computing resource loads for that job size. For example, the field component may set the execution time for the computing resource load of 1–10 to 0.81 and the execution time for the computing resource load of 21–30 to 0.83. In general, the field-component will have a projection factor that is used to project the actual execution time for job of the certain size throughout the various computing resource loads for that size. The field component may have a single projection factor for the entire matrix or may have different factors for each job size group. These projection factors can be empirically derived by running sample jobs of each job size group on farm systems with different computing resource loads. Alternatively, rather than simply replacing the execution times of a row based only on the single actual execution time, the field component may also factor in the existing execution in a row. For example, the field component may average the new execution time with the execution time (projected or actual) currently stored in the matrix. The field component may also use any type of function, such as exponential decay, to combine the new execution time with previous execution times. Also, the field component may alternatively or in combination adjust the execution times for other job sizes. The matrices may also be maintained on the master farmer system if the master farmer system is to calculate the completion times.

Figure 10:
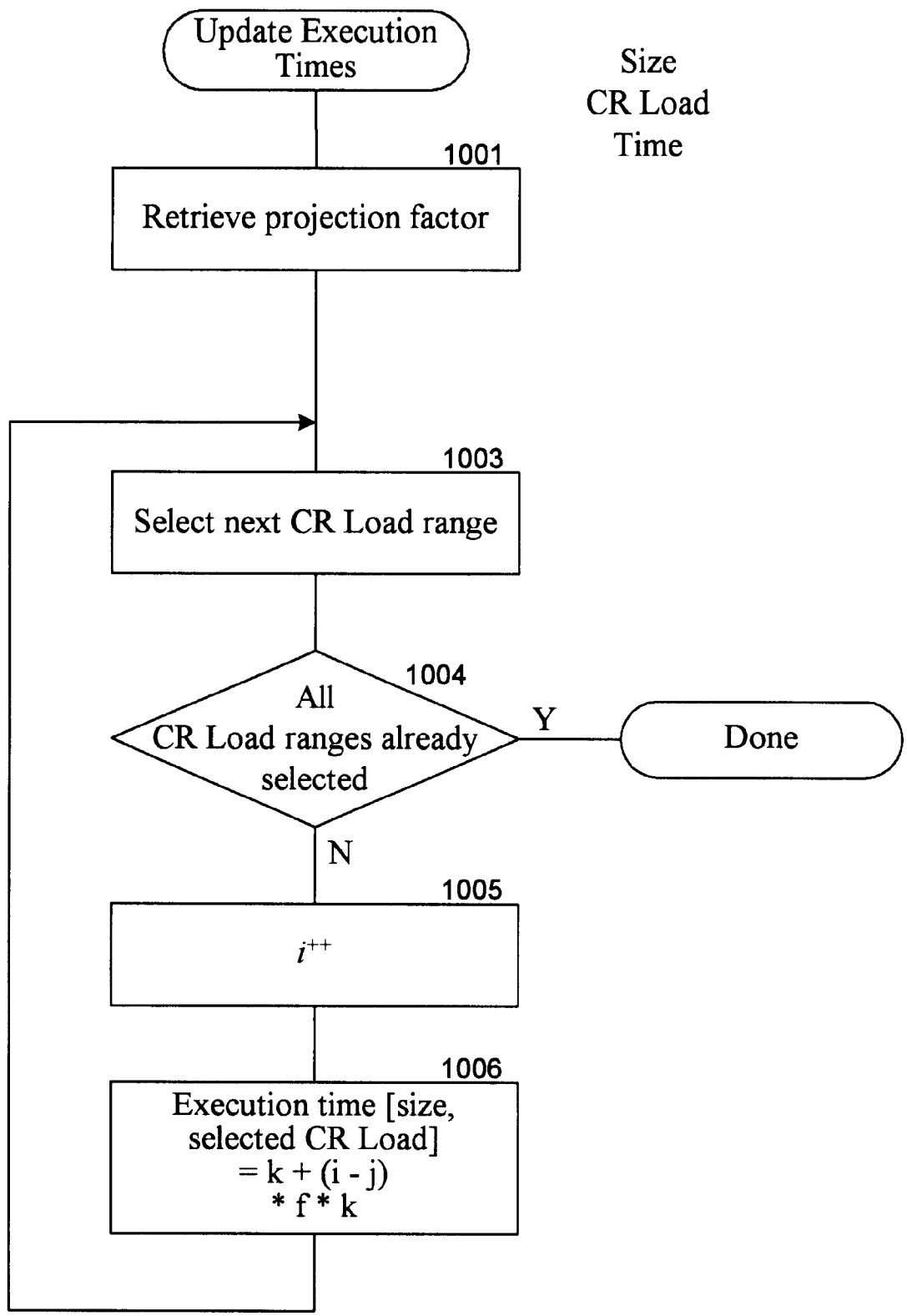
FIG. 10 is a flow diagram illustrating a routine to update the execution times of the matrix.

FIG. 10 is a flow diagram illustrating a routine to update the execution times of the matrix. This routine is passed a job size, a computing resource load, and an actual execution time. In block 1001, the routine retrieves the projection factor for the matrix. Although the projection in this example is linear, one skilled in the art will appreciate that nonlinear projections may also be used. In blocks 1003–1006, the routine loops setting the execution time for each entry in a row. In block 1003, the routine selects the next computing resource load group. In decision block 1004, if all the computing resource loads have already been selected, then the routine is done, else the routine continues at block 1005. In block 1005, the routine increments an index to count the number of computer resource load groups. In block 1006, the routine sets the execution times in the matrix to the projected execution time. The routine calculates the actual execution time (e) as follows:

$$e = k + (i-j) * f * k$$

where k is the actual execution time, i is the column number of the selected computing resource load, j is the index of the passed computing resource load, and f is the factor. The routine then loops to block 1003 to select the next computing resource load group.

Figure 11:
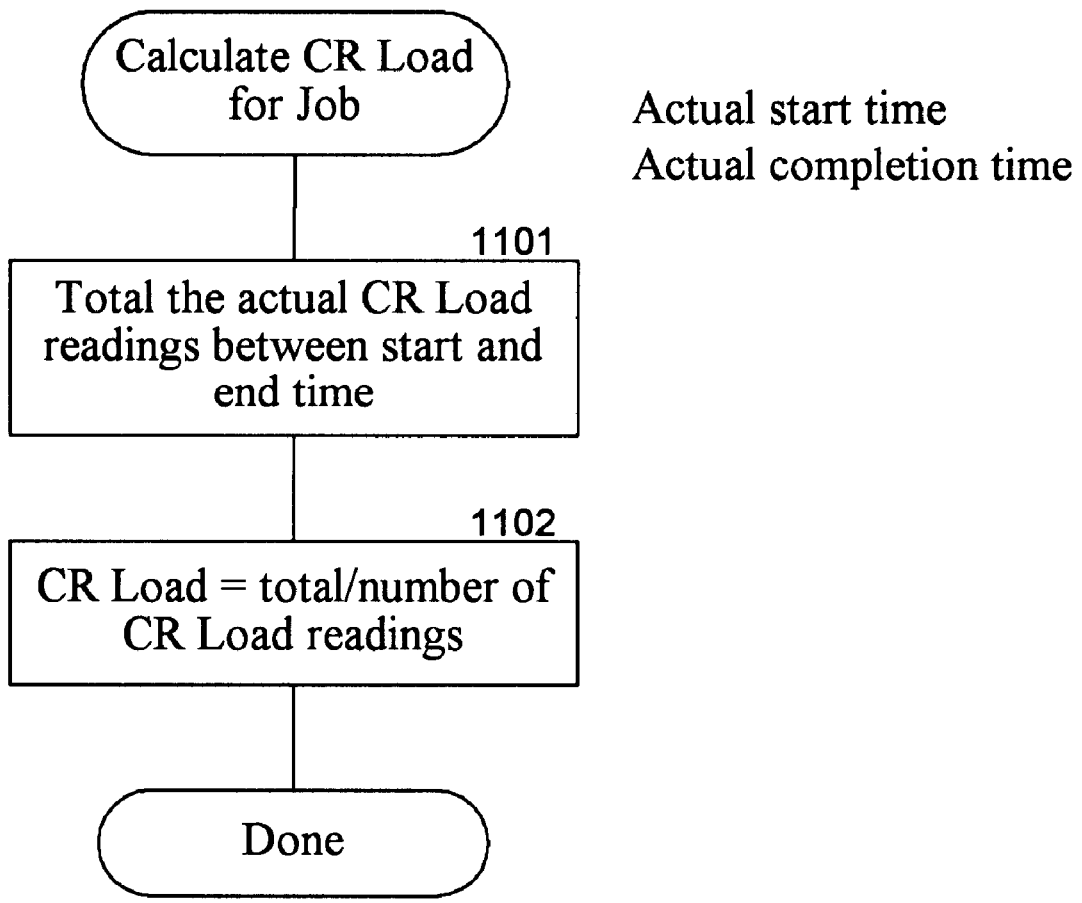
FIG. 11 is a block diagram illustrating a routine to calculate the computing resource load while a job ran.

FIG. 11 is a block diagram illustrating a routine to calculate the computing resource load while a job ran. The routine is passed the actual start time and actual completion time of the job. The routine calculates the average of the actual computing resource loads during running of the job. In block 1101, the routine retrieves and totals the actual computing resource load recordings made by the farm system between the start time and the completion time. In block 1102, the routine sets the computing resource load to that total divided by the number of readings. The routine then returns.

The application server system calculates the size of each job assuming that jobs of approximately the same size will generally use the same amount of computing system resources when they run. In one embodiment, the application server system calculates the size of a job based on the sizes of the input files and output files of a job. Certain application programs may use an amount of computing resources that varies in relation to be size of the input files. While other application programs may use an amount of computing resources that varies in relation to the size of the output files. Some application programs may even use an amount of computing resources that varies in relation to a combination of the sizes of the input and output files. Such application programs whose size can be based on the corresponding size of the input or output files may be CPU intensive application programs. To base the size of job on the size of the input file, the application server system may calculate the size of the job to be the percentage of the size of the input file to the maximum size of an input file for the application program. For example, if the maximum size input file is 600 MB and the input file size for the job is 300 MB, then the size of the job would be 50 percent (i.e., 300/600). If the actual input file size happens to be larger than 600 MB, then the job size is set to 100.

In one embodiment, multiple application server systems may be used to meet the processing needs of clients. For example, application server systems may be geographically distributed throughout the world to meet the processing needs of clients throughout the world. The processing requests of clients may be sent to the geographically closest application server system. Such an organization of application server systems may be particularly useful in the Internet environment. Although the placing of application server systems at various geographic locations may speed the communications between clients and the application server systems, it may create bottlenecks in certain application server systems. For example, one application server system at a certain to geographic location may not have sufficient farm systems at that location to satisfy the clients in its geographic area. Whereas, another application server system may have a surplus of farm systems. Moreover, the overall load on an application server system may vary considerably overtime. For example, the overall load on application server systems may be high during business hours and low during non-business hours of that geographic area. In one embodiment, a farm allocator system is used to dynamically change the allocation of farm systems of the various application server systems. As a result, some farm systems may not be geographically local to the master farmer system to which they are allocated. In addition, each farm system notifies its master farmer system when it is to be allocated or deallocated. (Thus, a slave computer is responsible for notifying its master computer when it is to be and not be its slave.)

Figure 12:
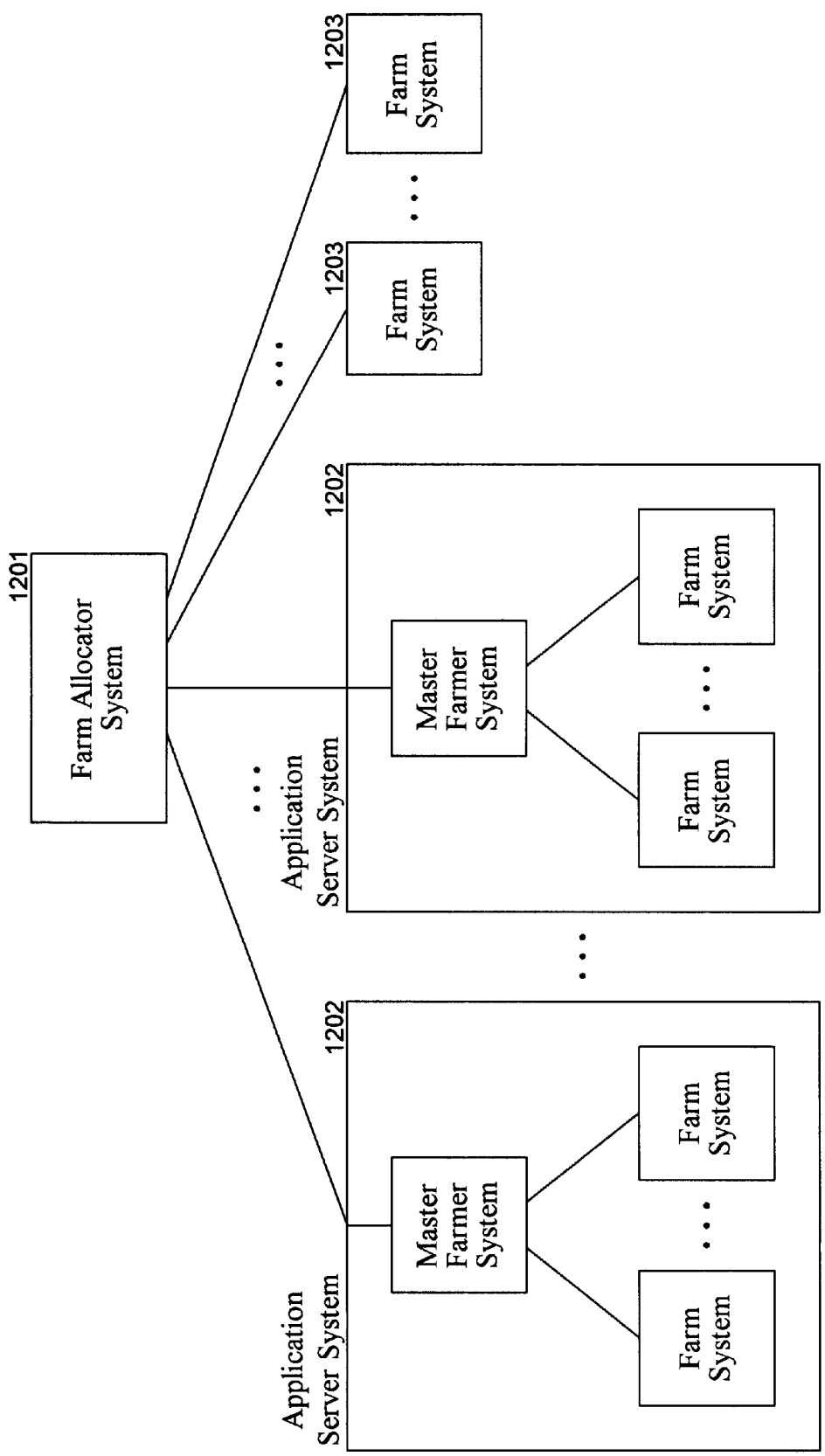
FIG. 12 is a block diagram illustrating the organization a multiple application server system.

FIG. 12 is a block diagram illustrating the organization a multiple application server system. The multiple application server system includes a farm allocator system 1201, application server systems 1202, and unallocated farm systems 1203. The farm allocator system receives statistical information from the application server systems. The statistical information may indicate the overall load of the application server systems and may indicate the characteristics of the jobs that are running on the application server systems. The farm allocator system decides when to allocate farm systems to and deallocate farm systems from the application server systems. When the farm allocator system decides to allocate a farm system to an application server system, it notifies the farm system of the master farmer system and provides information for configuring the farm system. The configuration information may include, for example, which application programs that the farm system is to support. The communications link between the farm allocator system and the master farmer systems and farm systems may be the Internet. The farm allocator system may provide the farm system with the Internet protocol ("IP") address of the master farmer system to which it is allocated. The farm system then notifies the master farmer system that it has been allocated to it and provides it with the farm system's configuration information. The master farmer system then updates its farm database. The master farmer system may then reassign jobs that are currently assigned to other of its farm systems to the newly allocated farm system. Alternatively, the master farmer system may wait until it receives a new request to run a job from a client and assign that job to the newly allocated farm system in normal course. The deallocation of a farm system from a master farmer system works in an analogous manner. In particular, the farm allocator system notifies the farm system to be deallocated. That farm system in turn notifies its master former system, which updates its farm database so that no more.jobs will be assigned to that deallocated farm system. The master farmer system may also reassign those jobs currently assigned to the deallocated farm system to other farm systems.

Figure 13:
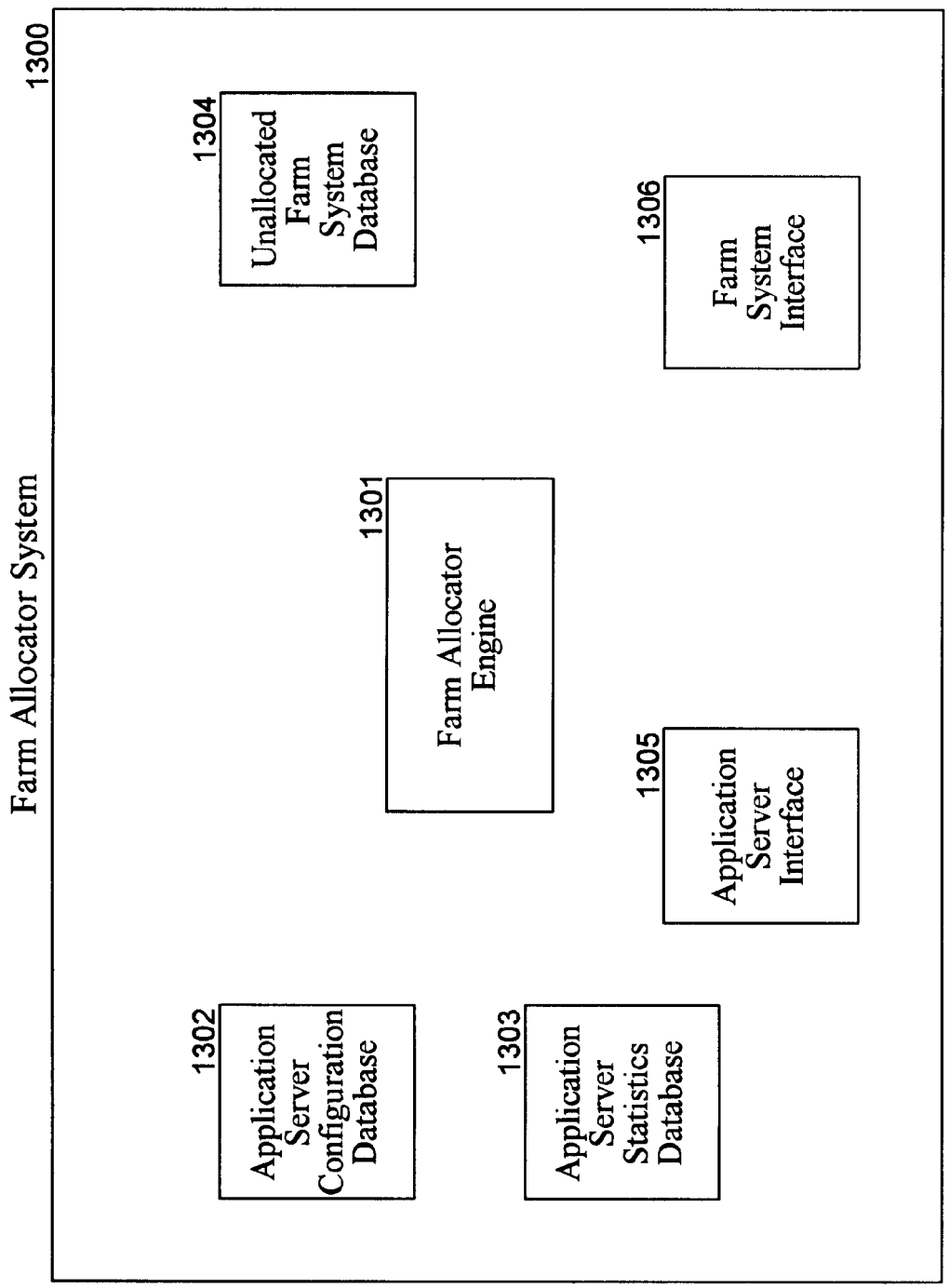
FIG. 13 is a block diagram illustrating example components of the farm allocator system.

FIG. 13 is a block diagram illustrating example components of the farm allocator system. The farm allocator system 1300 comprises a farm allocator engine 1301, an application server configuration database 1302, an application server statistics database 1303, an unallocated farm system database 1304, an application server interface 1305, and a farm system interface 1306. The farm allocator engine identifies when farm systems should be allocated to and deallocated from application server systems based on the information in the configuration database and statistics database. The configuration database contains information describing the current configuration of the application server systems. The configuration information indicates which farm systems are currently allocated to each application server system and indicates the number of each application program that a farm system is configured to execute. The statistics database contains statistical information about the running of jobs on each application server system. The statistical information may include historical data on the execution times, submission times, start times, and so on for each job that ran on a farm system. The application server interface receives the statistical information from the application server systems and stores that information in the statistics database. The farm system interface controls the notifying of the farm systems of their allocation and deallocation. The unallocated farm system database identifies those farm systems that are unallocated and contains information describing the characteristics of the farm systems.

The characteristics may include the processing power, location, and the application programs that can be executed by the farm system.

Figure 14:
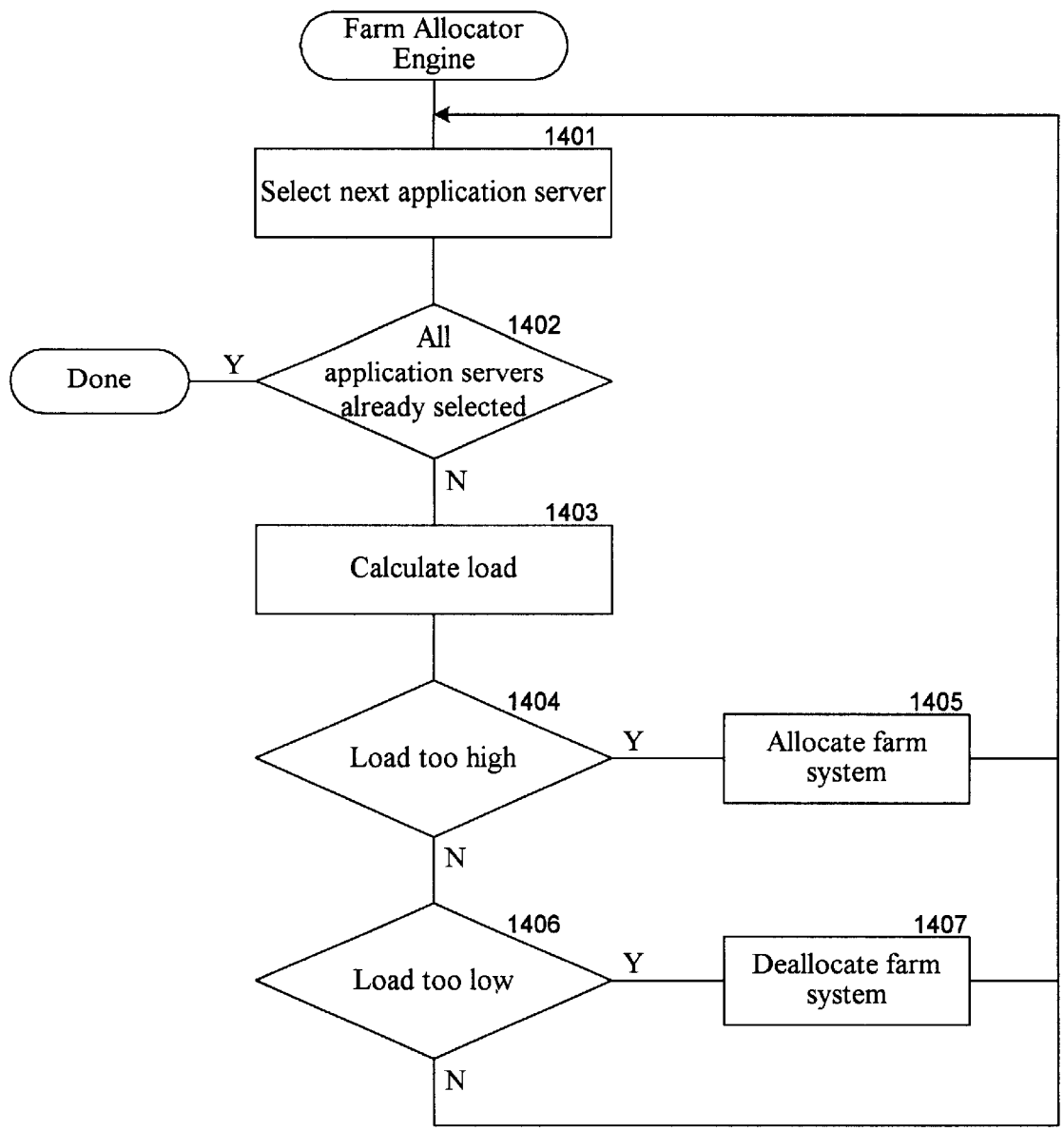
FIG. 14 is a flow diagram illustrating processing of the farm allocator engine.

FIG. 14 is a flow diagram illustrating processing of the farm allocator engine. The farm allocator engine may be periodically invoked to determine whether farm systems should be allocated or deallocated. In block 1401, the engine selects the next application server system. In decision block 1402, if all the application server systems have already been selected, then the engine is done, else the engine continues at block 1403. In block 1403, the engine calculates the overall load on the selected application server system. The engine may also have access to historical information to predict the overall load so that farm systems can be allocated in deallocated in advance as needed. In decision block 1404, if the overall load used too high, then the engine continues at block 1405, else the engine continues at block 1406. In block 1405, the engine allocates a farm system to the selected application server system. The engine may select a farm system that is geographically close to the application server system. Alternatively, as part of this allocation process, the engine may deallocate a farm system from another application server system so that it can be allocated to the selected application server system. The engine then loops to block 1401 to select the next application server system. In decision block 1406, if the overall load of the selected application server system is too low, then the engine continues at block 1407, else the engine loops to block 1401 to select the next application server system. In block 1407, the engine notifies a farm system of the selected application server system to deallocate. The engine may select the farm system to deallocate based on the characteristics (e.g., location) of the farm system. The engine then loops to block 1401 to select the next application server system.

Figure 15:
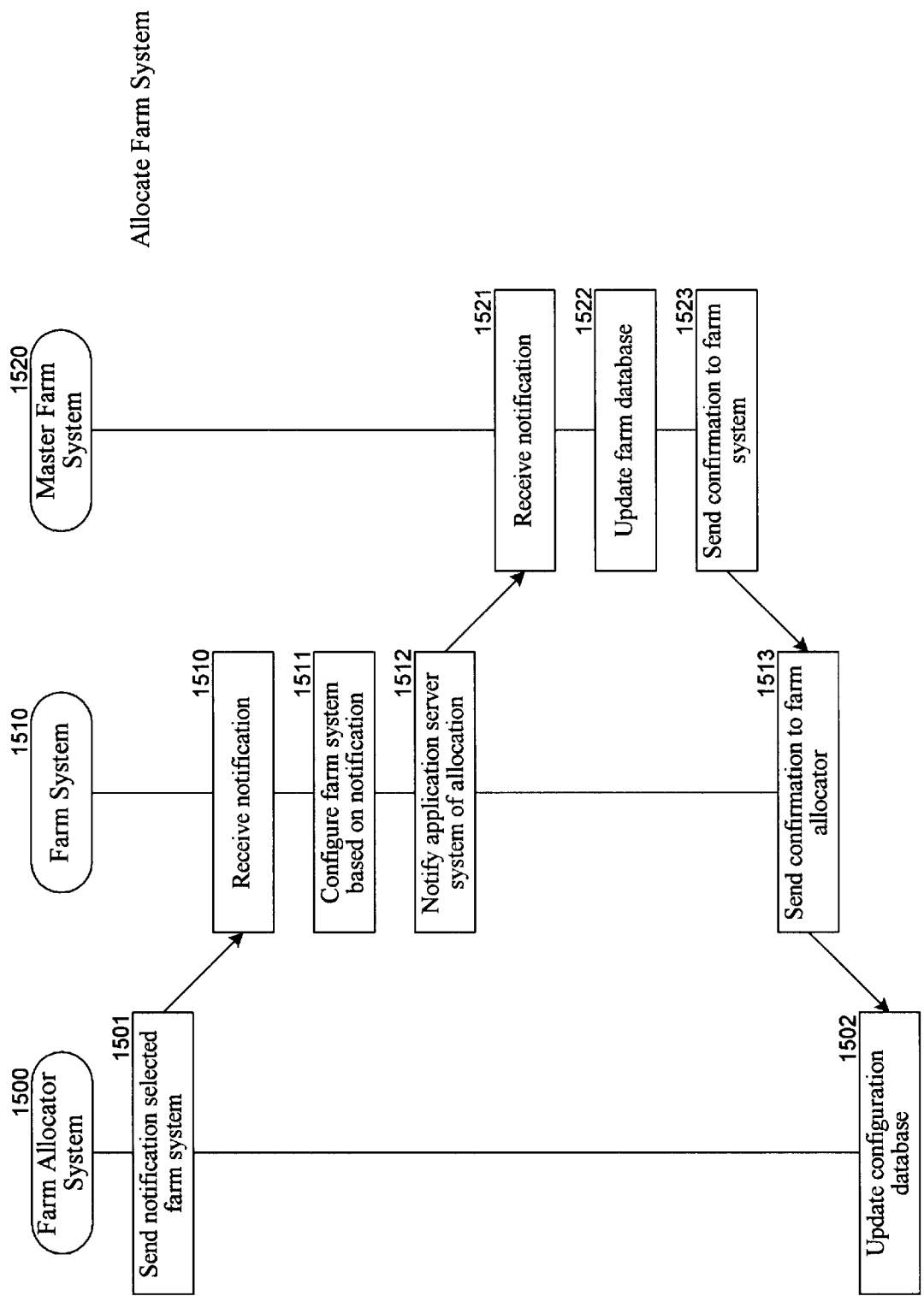
FIG. 15 is a diagram illustrating the process of allocating a farm system to an application server system.

FIG. 15 is a diagram illustrating the process of allocating a farm system to an application server system. Flow diagram 1500 represents the processing of the farm allocator system, flow diagram 1510 represents the processing of a farm system, and flow diagram 1520 represents the processing of a master farmer system. The processing of flow diagram 1500 is invoked to allocate a farm system to an application server system. In block 1501, the farm allocator system sends a notification to the selected farm system. This notification includes information identifying the master farmer system to which the farm system is to be allocated and may include configuration information for the farm system. In block 1510, the farm system receives the notification. In block 1511, the farm system configures itself based on the configuration information. In block 1512, the farm system notifies the master farmer system to which it is allocated. In block 1520, the master farmer system receives the notification. In block 1522, the master farmer system updates its farm database to reflect the allocation. The master farmer system may also reassign jobs to the farm system at that time. In block 1523, the master farmer system sends a confirmation to the farm system. In block 1513, the farm system receives the confirmation and sends the confirmation to the farm allocator system. In block 1502, the farm allocator system receives the confirmation and updates its configuration and unallocated farm system databases as appropriate.

The farm allocator system may dynamically configure farm systems as they are allocated to application server systems. The farm allocator system may determine which application programs should be executed by the farm system to be allocated. The farm allocator system may make this determination based on the statistics in the application server statistics database. For example, if a certain application server system cannot service in a timely manner all the jobs for a certain application program, the farm allocator system may configure a farm system to be allocated or already allocated to run jobs only for that certain application program. In one embodiment, the farm allocator system may direct the storing in a file system directory of the farm system one or more files containing the field component and plot component corresponding each application program that the farm system is configured to execute. The farm system can then look to that directory to identify which application programs it may execute. The directory may also contain the actual application program. The field component may be stored as a dynamic link library, and the plot component may be stored as an executable file. During its operation, the farm system will look to that directory to determine for which application programs it may run jobs. In one embodiment, the configuration of a farm system can be changed dynamically by adding files to or removing files from the directory after startup of the farm system. Whenever a farm system receives a request to estimate the completion time of a job to be assigned, the farm system may check the directory and only provide an estimate if the directory indicates that the farm system can run that job. The farm module of the farm may link in field components dynamically as the corresponding dynamic link library file is detected in the directory.

The application server system may monitor its various components to identify when a failure occurs. A failure may be a failure of hardware of farm system; failure of the operating system of the farm system; failure of a farm module, a field component, or a plot component; failure of an application program; failure as a result of bad input data; and so on. Certain of these failures may be catastrophic in the sense that the master farmer system immediately knows that it should not assign any additional jobs to the farm system and may even reassign those jobs currently assigned to the farm system. For example, a hardware failure, such as a memory failure, may make it impractical for jobs to run on the farm system. Other failures may not be catastrophic in the sense that the farm system may continue to operate, albeit in a diminished capacity. If the capacity is so diminished, the master farmer system may want to stop assigning jobs to that farm system.

The various components of the farm system may monitor the execution of other components to detect failures. In particular, the farm module may monitor the execution of the field components, the field components may monitor the execution of the plot components, the plot components may monitor the execution of the application programs, and an application program may monitor its own execution. Whenever a failure is detected, the monitoring component is notified of the failure and the reason for the failure. The monitoring component may then in turn notified its monitoring component. Ultimately, a client may be notified of certain failures. However, each monitoring component may take steps to restart the activity that failed. For example, if the farm module detects that a certain field component has failed, that farm module may then re-queue the jobs that were assigned to that field component and then restart that field component. If another failure is detected, then the farm module may notify the master farmer system that jobs for the application programs corresponding to the failed field component can no longer be run. Similarly, if a plot component detects that an application program has failed, it passes on the reason for the failure to the field component. A plot component may detect that an application program has failed by monitoring the input file access, output file access, or both of the application program. If, for example, the application program has not accessed these files or not added data to the output file, it may be assumed that the application program has failed. Each monitoring component may decide whether to notify its monitoring component or attempt to correct the failure itself. The various components may fail as a result of programming errors (e.g., resulting in a general protection fault) or as a result of hardware errors.

A master farmer system may notify the farm allocator system when a failure has occurred at a farm system. The farm allocator system may want to allocate an additional farm system to that application server or to reconfigure a farm system currently allocated to that application server system. Alternatively, the master farmer system may direct the reconfiguration of one of its farm systems.

Based upon the above description, it will be appreciated that, although specific embodiments of the invention have been described herein for purposes of illustration, various modifications may be made without deviating from the spirit and scope of the invention. Accordingly, the invention is not limited except as by the appended.

What is claimed is:

1. A method in an application server system for processing failures, the method comprising:
    under control of a plot component of a farm system,
        detecting that an application program for a job has failed; and
        notifying a master farmer system of the farm system that failure of the application program has been detected; and
    under control of the master farmer system,
        when the failure is not a result of improper input to the application program, assigning the job to another farm system; and
        when the failure is a result of improper input to the application program, notifying a client that submitted the job.

2. The method of claim 1 including sending to the client that submitted the job a new estimated completion time.

3. The method of claim 1 wherein the notification to the client indicates a reason for the failure.

4. The method of claim 1 wherein the detecting that an application program for a job has failed includes monitoring the size of an output file of the application program.

5. The method of claim 1 wherein the detecting that an application program for a job has failed includes monitoring reading of an input file of the application program.

6. The method of claim 1 wherein the assigning includes determining an estimated completion time for each of a plurality of farm systems and assigning the job to the farm system with the earliest estimated completion time.

7. The method of claim 6 wherein determining the estimated completion time includes determining a start time, a computing resource load on the farm system if the job were to start at the start time, an execution time of the job on the farm system based on a job size and the computing resource load of the farm system at the start time, and a completion time based on the start time and execution time.

8. A method in a master farmer system for processing failures, the method comprising:
    receiving a notification from a farm system of a failure of an application program for a job; and
    assigning the job to another farm system when the failure is not a result of improper input to the application program and notifying a client that submitted the job when the failure is a result of improper input to the application program.

9. The method of claim 8 including sending to the client that submitted the job a new estimated completion time when the job is assigned to another farm system.

10. The method of claim 8 wherein the notifying a client includes indicating a reason for the failure.

11. A method in an application server system for processing failures, the method comprising:
    step for detecting that a job has failed while executing on a farm system; and
    step for, when the failure is not a result of improper input to an application program of the job, assigning the job to another farm system and, when the failure is a result of improper input to the application program, notifying a client that submitted the job that the job has failed.

12. The method of claim 11 including step for sending to the client that submitted the job a new estimated completion time.

13. The method of claim 11 wherein the notifying indicates reason for the failure.

14. The method of claim 11 wherein the step for detecting includes step for monitoring the size of an output file of the application program.

15. The method of claim 11 wherein the step for detecting includes step for monitoring reading of an input file of the application program.

16. The method of claim 11 wherein the step for assigning the job to another farm system includes step for determining an estimated completion time for each of a plurality of farm systems wherein the job is assigned to the farm system with the earliest estimated completion time.

17. The method of claim 16 wherein the step for determining an estimated completion time includes step for determining a start time, a computing resource load on the farm system if the job were to start at the start time, an execution time of the job on the farm system based on a job size and the computing resource load on the farm system at the start time, and a completion time based on the start time and execution time.

18. A method for recovering from failures in a farm system, the system comprising:
    detecting when an application program for a job has failed while executing on a farm system and detecting when the farm system has failed;
    when the farm system has failed, identifying all the jobs that were currently assigned to the farm system and assigning each job to another farm system; and
    when an application program for a job has failed while executing on a farm system, when the failure is not a result of improper input to the application program, assigning the job to another farm system and, when the failure is a result of improper input to the application program, notifying a client that submitted the job.

19. The method of claim 18 wherein the failure of the farm system is detected as a result of the farm system not responding.

20. The method of claim 18 wherein the failure of the farm system is a hardware failure of the farm system.

21. The method of claim 18 wherein the farm system indicates to a master farmer system that a failure has occurred.

22. The method of claim 18 wherein the failure is a failure of a software component of the farm system.

23. The method of claim 18 including sending to the client that submitted the job a new estimated completion time.

24. The method of claim 18 wherein the notifying indicates a reason for the failure.

25. The method of claim 18 wherein the detecting that an application program for a job has failed includes monitoring the size of an output file of the application program.

26. The method of claim 18 wherein the detecting that an application program for a job has failed includes monitoring reading of an input file of the application program.

27. The method of claim 18 wherein the assigning includes determining an estimated completion time for farm systems and assigning the job to the farm system with the earliest estimated completion time.

28. The method of claim 27 wherein the determining an estimated completion time includes determining a start time, a computing resource load on the farm system if the job were to start at the start time, an execution time of the job on the farm system based on a job size and the computing resource load on the farm system at the start time.

* * * * *

UNITED STATES PATENT AND TRADEMARK OFFICE
CERTIFICATE OF CORRECTION

PATENT NO. : 6,618,820 B1
DATED : September 9, 2003
INVENTOR(S) : Krum

It is certified that error appears in the above-identified patent and that said Letters Patent is hereby corrected as shown below:

Title page,
Item [62], Related U.S. Application Data, delete "Continuation of application No. 60/131,716, filed on Apr. 30, 1999";

Column 5,
Line 14, delete period between "more" and "central";
Line 31, delete comma between "database" and "202";
Line 36, "finctions" should be -- functions --;

Column 7,
Line 41, delete comma between "to" and "the";

Column 10,
Line 10, delete extra period between "completes" and "For";
Line 24, delete hyphen between "field" and "component";

Column 12,
Line 36, delete period between "more" and "jobs";

Signed and Sealed this

Twenty-ninth Day of June, 2004

JON W. DUDAS
*Acting Director of the United States Patent and Trademark Office*